US011246099B2

(12) United States Patent
Yoneyama et al.

(10) Patent No.: US 11,246,099 B2
(45) Date of Patent: Feb. 8, 2022

(54) TERMINAL USING FIRST OR SECOND TRANSMIT MODE BASED ON LEVEL OF STORED POWER

(71) Applicant: SONY SEMICONDUCTOR SOLUTIONS CORPORATION, Kanagawa (JP)

(72) Inventors: Yusuke Yoneyama, Tokyo (JP); Ryo Takai, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 17/042,347

(22) PCT Filed: Feb. 15, 2019

(86) PCT No.: PCT/JP2019/005473
§ 371 (c)(1),
(2) Date: Sep. 28, 2020

(87) PCT Pub. No.: WO2019/193843
PCT Pub. Date: Oct. 10, 2019

(65) Prior Publication Data
US 2021/0014795 A1 Jan. 14, 2021

(30) Foreign Application Priority Data
Apr. 6, 2018 (JP) .............................. JP2018-074116

(51) Int. Cl.
*H04W 52/02* (2009.01)
*H04W 4/38* (2018.01)
(Continued)

(52) U.S. Cl.
CPC .......... *H04W 52/0277* (2013.01); *H04W 4/38* (2018.02); *H04W 28/06* (2013.01); *H04W 52/146* (2013.01)

(58) Field of Classification Search
CPC ....... H04W 28/06; H04W 4/38; H04W 52/02; H04W 52/0277; H04W 52/146;
(Continued)

(56) References Cited

U.S. PATENT DOCUMENTS

| 2010/0020734 A1 | 1/2010 | Nakagawa et al. | |
| 2011/0211659 A1* | 9/2011 | Kosakowski | H04L 1/0054 375/341 |
| 2013/0203452 A1* | 8/2013 | Awoniyi | H04W 52/0203 455/500 |

FOREIGN PATENT DOCUMENTS

| EP | 2150086 A1 | 2/2010 |
| JP | 2002-065640 A | 3/2002 |

(Continued)

*Primary Examiner* — Philip Sobutka
(74) *Attorney, Agent, or Firm* — Chip Law Group

(57) ABSTRACT

By switching the transmission mode according to the power amount of a power storage unit in a wireless communication terminal, appropriate communication performance is ensured. A communication unit transmits a packet. A comparison unit compares the power amount of the power storage unit with a predetermined threshold. A control unit causes the communication unit to transmit first transmission data in a first transmission mode in a case where the power amount of the power storage unit is larger than a predetermined threshold. Furthermore, the control unit causes the communication unit to transmit second transmission data including a known payload in a second transmission mode in a case where the power amount of the power storage unit is not larger than the predetermined threshold.

10 Claims, 10 Drawing Sheets

(51) Int. Cl.
*H04W 28/06* (2009.01)
*H04W 52/14* (2009.01)

(58) Field of Classification Search
CPC ......... H04W 52/0209; H04W 52/0261; H04W 52/0264; H04L 1/08; Y02D 30/70
USPC .................................. 455/127.5, 343.5, 574
See application file for complete search history.

(56) References Cited

FOREIGN PATENT DOCUMENTS

| | | |
|---|---|---|
| JP | 2010-034726 A | 2/2010 |
| JP | 2010-038850 A | 2/2010 |
| JP | 2011-233980 A | 11/2011 |
| JP | 2014-060815 A | 4/2014 |
| JP | 2017-049896 A | 3/2017 |

* cited by examiner

TERMINAL USING FIRST OR SECOND TRANSMIT MODE BASED ON LEVEL OF STORED POWER

CROSS REFERENCE TO RELATED APPLICATIONS

This application is a U.S. National Phase of International Patent Application No. PCT/JP2019/005473 filed on Feb. 15, 2019, which claims priority benefit of Japanese Patent Application No. JP 2018-074116 filed in the Japan Patent Office on Apr. 6, 2018. Each of the above-referenced applications is hereby incorporated herein by reference in its entirety.

TECHNICAL FIELD

The present technology relates to a wireless communication terminal. More specifically, the present technology relates to a wireless communication terminal that includes a power storage unit for charging and performs wireless communication, and a processing method in the wireless communication terminal and the power storage unit.

BACKGROUND ART

In recent years, a system for collecting information from various places and things via a wireless network is being constructed by using Internet of Things (IoT) technology. In such a system, a rechargeable battery is often used, for example, in order to stabilize supply of a power supply. For example, there has been proposed a sensing system that monitors the remaining charge amount and transmits a request to start charging in a case where the remaining charge amount is equal to or less than a predetermined value (for example, see Patent Document 1).

CITATION LIST

Patent Document

Patent Document 1: Japanese Patent Application Laid-Open No. 2002-065640

SUMMARY OF THE INVENTION

Problems to be Solved by the Invention

In the above-described conventional technology, supply of the power supply is secured by starting charging according to the remaining charge amount. However, depending on the communication scheme, transmission is supposed to be performed a plurality of times in some cases, and if the charge amount becomes zero during that time, communication performance may not be sufficiently exhibited.

The present technology has been created in view of such a situation, and an object thereof is to ensure appropriate communication performance by switching a transmission mode according to the power amount of a power storage unit in a wireless communication terminal.

Solution to Problems

The present technology has been made in order to solve the above-described problems, and a first aspect the present technology is a wireless communication terminal and a wireless communication method of the wireless communication terminal including a communication unit configured to transmit a packet, a comparison unit configured to compare a power amount of a power storage unit with a predetermined threshold, and a control unit configured to cause the communication unit to transmit first transmission data as the packet in a first transmission mode in a case where the power amount is larger than the predetermined threshold and causes the communication unit to transmit second transmission data including a known payload as the packet in a second transmission mode in a case where the power amount is not larger than the threshold. With this arrangement, the effect of switching the transmission data and the transmission mode according to the power amount of the power storage unit is brought about.

Furthermore, in the first aspect, the first transmission mode may be a mode in which the first transmission data is transmitted a plurality of times. Therefore, in the first transmission mode, transmission performed a plurality of times brings about the effect of improving reception sensitivity.

In addition, in the first aspect, the second transmission mode may be a mode in which the second transmission data is transmitted in a smaller number of times than the plurality of times in the first transmission mode. Therefore, in the second transmission mode, the effect of reducing the number of times transmission is performed by increasing sensitivity in transmission performed in each time is brought about.

Furthermore, in the first aspect, the predetermined threshold may be a power amount required to transmit the first transmission data a plurality of times in the first transmission mode. Therefore, the effect of switching the transmission data and the transmission mode according to the power amount required for transmission in the first transmission mode is brought about.

Furthermore, in the first aspect, the comparison unit may acquire the power amount before starting a transmission sequence and compares the power amount with the predetermined threshold. Therefore, the effect of switching the transmission data and the transmission mode for each transmission sequence is brought about.

Furthermore, in the first aspect, a charging unit configured to charge the power storage unit may be further provided. Therefore, the effect of charging the power storage unit is brought about.

Furthermore, in the first aspect, the control unit may cause the communication unit to transmit the second transmission data as the packet in the second transmission mode, the second transmission data including a known payload indicating transition to a state of performing only charging of the charging unit in a case where a state transitions to a state where the power amount is larger than the predetermined threshold to a state where the power amount is not greater than the predetermined threshold. Therefore, the effect of notifying the outside of transition to the charging-only state is brought about.

Furthermore, in the first aspect, the control unit may cause the communication unit to transmit the second transmission data as the packet in the second transmission mode, the second transmission data including a known payload indicating termination of the state of performing only charging of the charging unit in a case where a state transitions to a state where the power amount is not larger than the predetermined threshold to a state where the power amount is larger than the predetermined threshold. Therefore, the effect of notifying the outside of termination of the charging-only state is brought about.

Furthermore, in the first aspect, the control unit may cause the communication unit to transmit the second transmission data as the packet in the second transmission mode, the second transmission data including a known payload according to the power amount in a case where the power amount is not larger than the predetermined threshold. Therefore, the effect of notifying the outside of the power amount of the power storage unit is brought about.

Furthermore, in the first aspect, a sensor configured to sense ambient environment data may be further provided, and the first transmission data may include the ambient environment data sensed by the sensor. Therefore, the effect of transmitting the ambient environment data in a case where the power amount is larger than the predetermined threshold is brought about.

Furthermore, in the first aspect, the communication unit may transmit the packet including an identifier of the wireless communication terminal. Therefore, the effect that a packet receiving side identifies the wireless communication terminal, which is a transmitting side, is brought about.

Effects of the Invention

According to the present technology, by switching the transmission mode according to the power amount of the power storage unit in the wireless communication terminal, it is possible to achieve an excellent effect of ensuring appropriate communication performance. Note that the effects described here are not necessarily limited, and may be any effect described in the present disclosure.

MODE FOR CARRYING OUT THE INVENTION

Hereinafter, an embodiment for implementing the present technology (hereinafter, referred to as an embodiment) will be described. The description will be given in the following order.
1. System configuration
2. Operation 1. System Configuration

Figure 1:
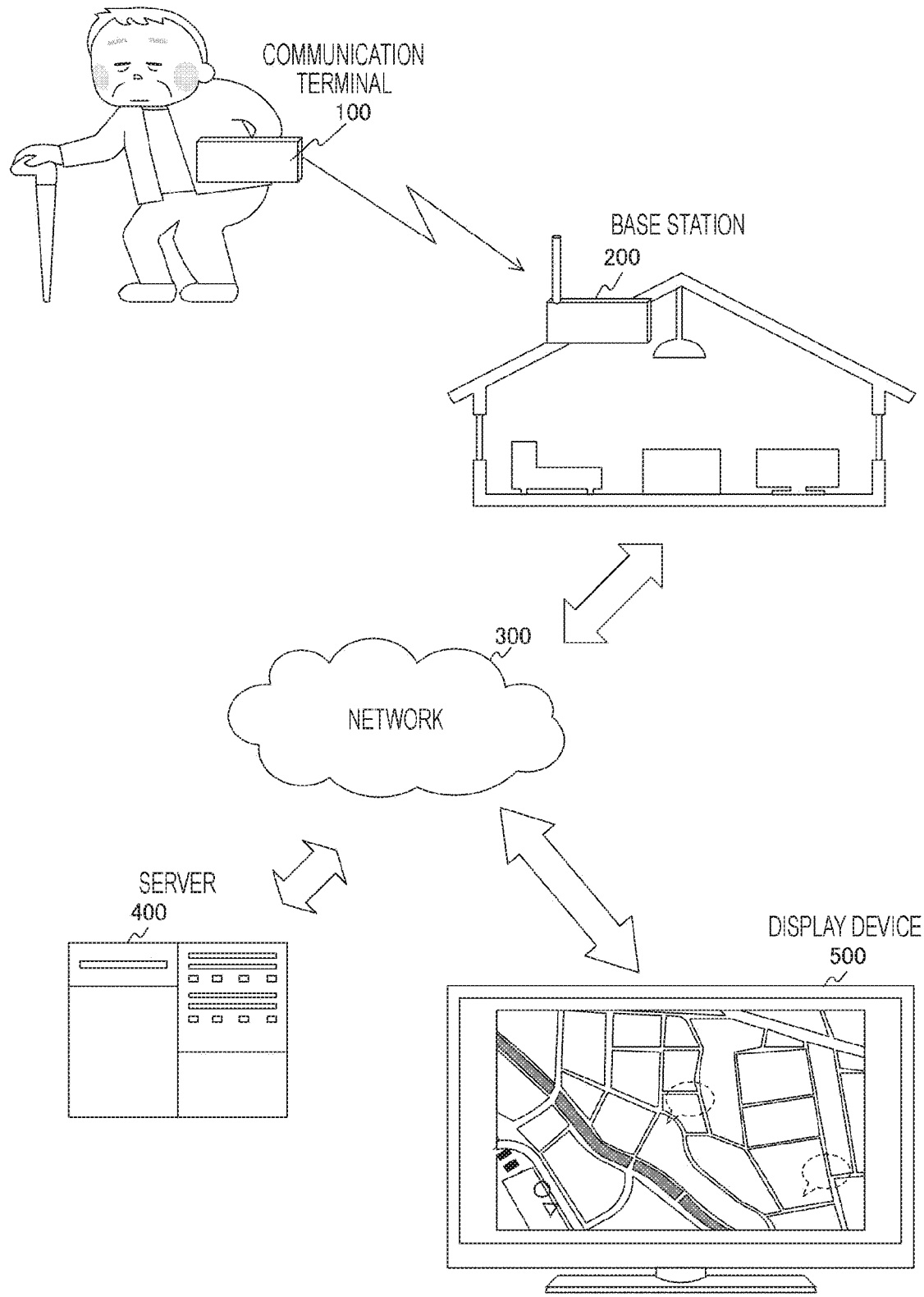
FIG. 1 is a diagram illustrating an overall configuration of a watching system as an example in an embodiment of the present technology.

[Watching system]
FIG. 1 is a diagram illustrating an overall configuration of a watching system as an example in an embodiment of the present technology.

The present technology can be applied to IoT devices in general having a communication function. Here, as an example, a watching system using an IoT device will be described. In this watching system, it is assumed that a person who is a target to be watched carries a communication terminal 100, which is an IoT device.

The communication terminal 100 has a sensing function and a communication function as described later, and transmits the sensing result to the outside. Therefore, the communication terminal 100 connects to a base station 200 installed at home or the like by wireless communication.

The base station 200 connects to a network 300 such as the Internet and transmits information collected by the communication terminal 100 to a server 400.

The server 400 connects to the network 300 and stores information received from the communication terminal 100 via the base station 200.

A display device 500 connects to the network 300 and displays information accumulated in the server 400 on a screen. Therefore, the position, health condition, and the like of a target to be watched can be grasped by the display device 500 existing at a location away from the target to be watched.

Figure 2:
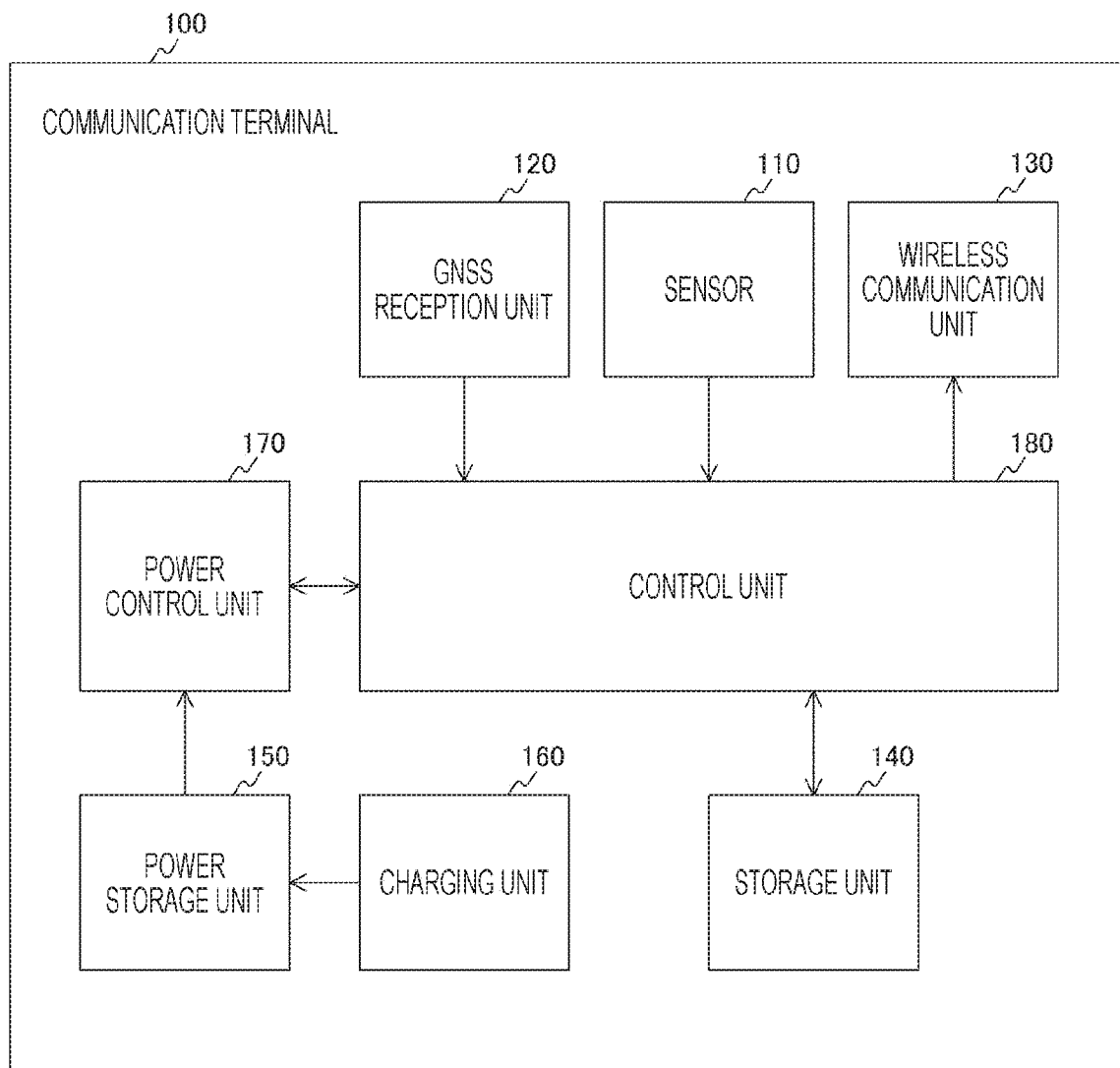
FIG. 2 is a diagram illustrating a configuration example of a communication terminal 100 in the embodiment of the present technology.

FIG. 2 is a diagram illustrating a configuration example of the communication terminal 100 in the embodiment of the present technology.

The communication terminal 100 includes a sensor 110, a GNSS reception unit 120, a wireless communication unit 130, a storage unit 140, a power storage unit 150, a charging unit 160, a power control unit 170, and a control unit 180.

The sensor 110 acquires ambient environment data by measuring (sensing). As the sensor 110, for example, a temperature sensor, an atmospheric pressure sensor, a vibration sensor, or the like is assumed.

The GNSS reception unit 120 receives a global navigation satellite system (GNSS) signal and measures position information. Therefore, it is possible to appropriately acquire position information of the communication terminal 100. Note that the global positioning system (GPS) is known as a typical example of the GNSS.

The wireless communication unit 130 performs wireless communication with the outside. The wireless communication unit 130 transmits a predetermined packet by wireless communication via an antenna (not illustrated). Note that the wireless communication unit 130 is an example of the communication unit described in the claims.

The storage unit 140 is a memory that stores data and the like necessary for operation of the communication terminal 100. The storage unit 140 stores, for example, information acquired by the sensor 110 and the GNSS reception unit 120.

Information stored in the storage unit 140 can thereafter be a target to be transmitted by the wireless communication unit 130.

The power storage unit 150 is a battery that stores power required for operation of the communication terminal 100. The charging unit 160 charges the power storage unit 150. In an IoT device, it is important that battery replacement and charging do not take much effort. Therefore, here, it is assumed that energy harvesting is applied. Energy harvesting is a technology of converting energy existing in surroundings such as vibration, light, or heat into power, and is also called an environmental energy generation technology. That is, the charging unit 160 operates so as to charge the power storage unit 150 by using sunlight or the like.

The power control unit 170 manages the power amount of the power storage unit 150. The power control unit 170 compares, for example, the power amount of the power storage unit 150 with a predetermined threshold and notifies the control unit 180 of the comparison result. Therefore, the control unit 180 can cause the wireless communication unit 130 to perform wireless communication according to the comparison result. Note that the power control unit 170 is an example of the comparison unit described in the claims.

The control unit 180 controls the overall operation of the communication terminal 100. For example, the control unit 180 causes the storage unit 140 to store information acquired by the sensor 110 and the GNSS reception unit 120, and furthermore, causes the wireless communication unit 130 to transmit the information that is stored. Furthermore, for example, the control unit 180 causes the wireless communication unit 130 to perform wireless communication according to the comparison result of the power control unit 170.

Figure 3:
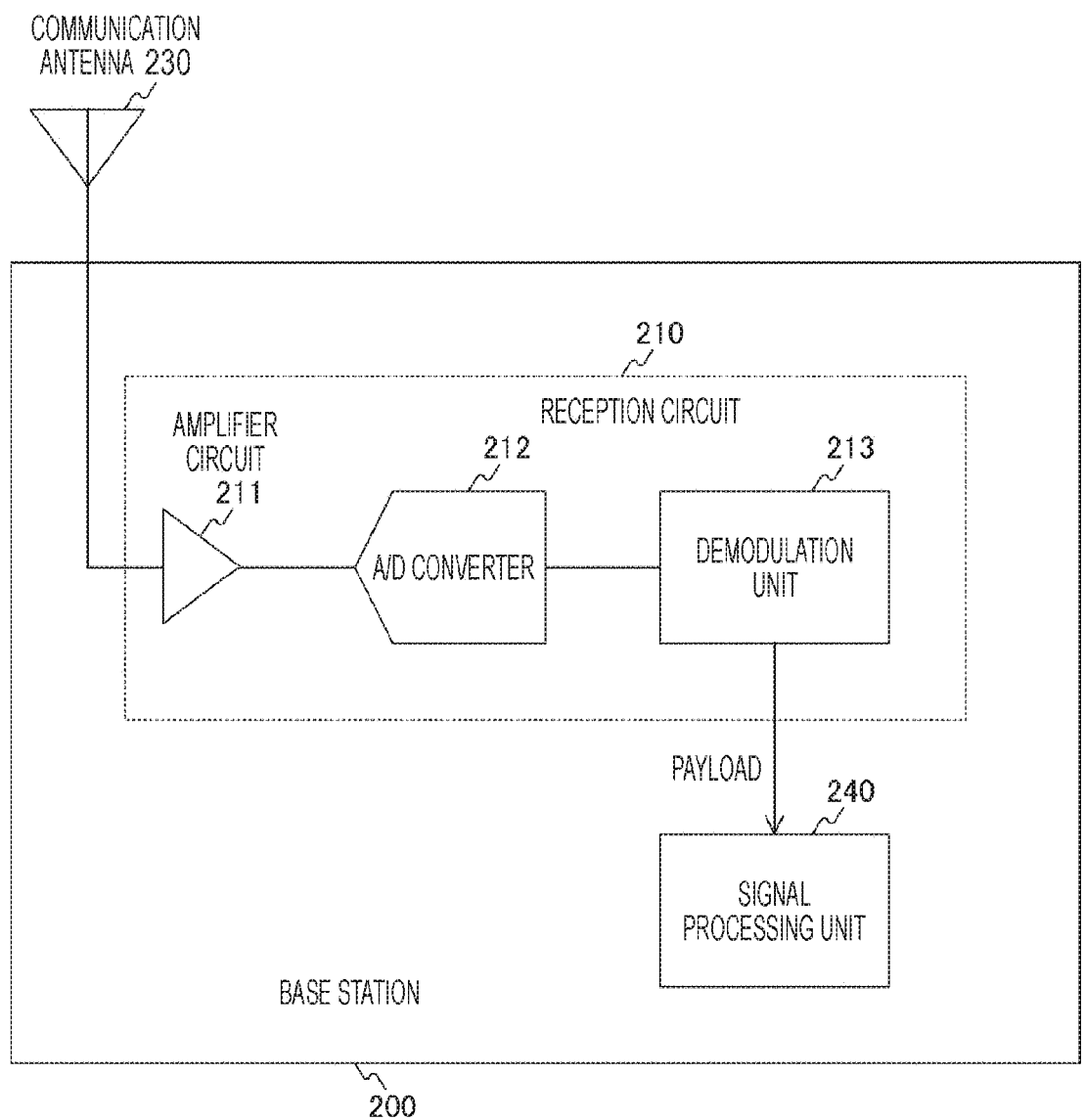
FIG. 3 is a diagram illustrating a configuration example of a base station 200 in the embodiment of the present technology.

FIG. 3 is a diagram illustrating a configuration example of the base station 200 in the embodiment of the present technology.

The base station 200 includes a reception circuit 210 and a signal processing unit 240. The reception circuit 210 receives a signal from the communication terminal 100 via a communication antenna 230. The reception circuit 210 includes an amplifier circuit 211, an A/D converter 212, and a demodulation unit 213.

The amplifier circuit 211 is an amplifier that amplifies a high-frequency signal received by the communication antenna 230. The A/D converter 212 is an analog-to-digital converter (A/D converter) that converts an analog signal output from the amplifier circuit 211 into a digital signal. The demodulation unit 213 demodulates a modulated signal output from the A/D converter 212. The demodulation unit 213 can extract the payload of a packet.

The signal processing unit 240 performs predetermined signal processing on the payload demodulated by the demodulation unit 213.

[Communication Scheme]

Figure 4:
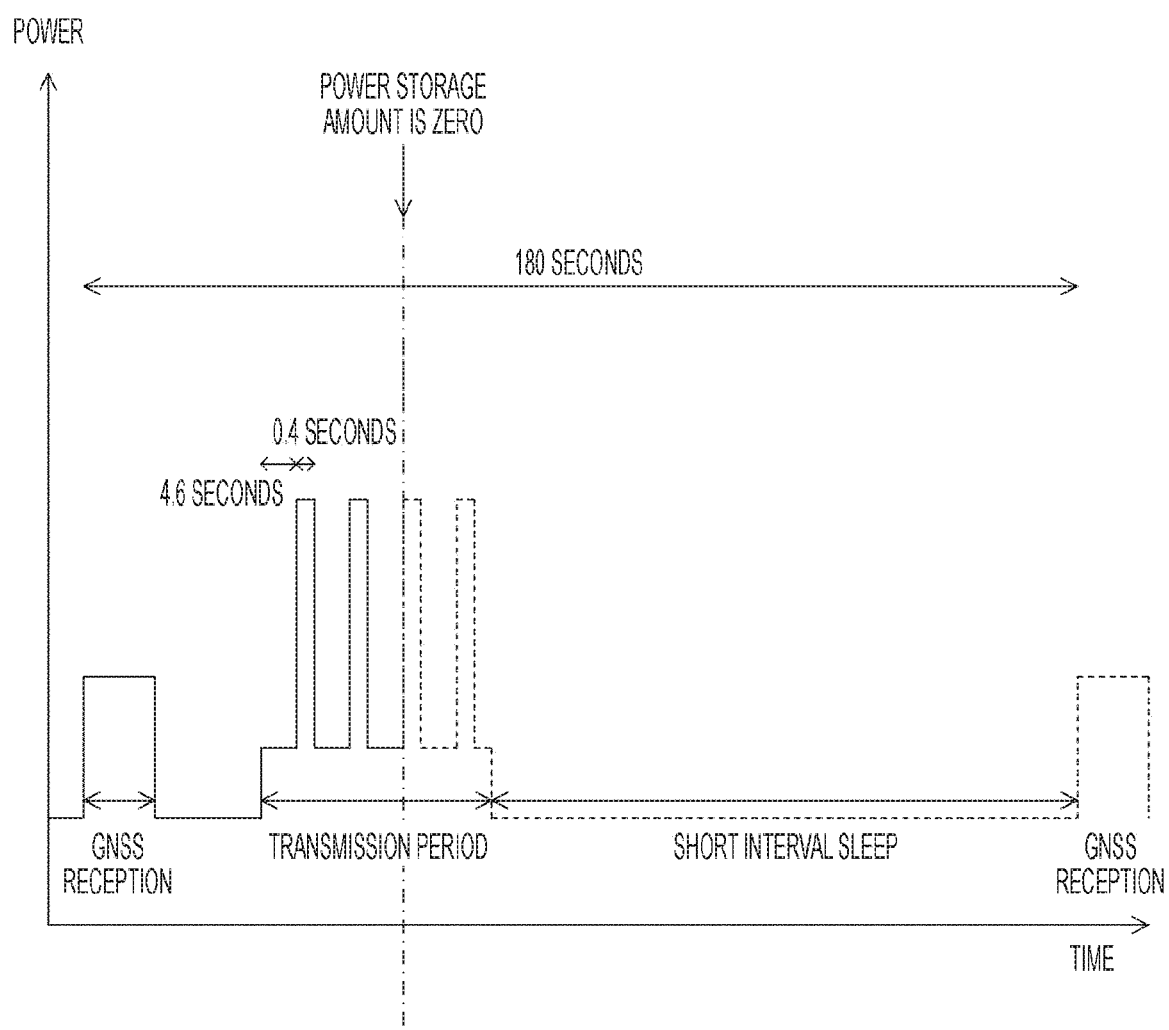
FIG. 4 is a diagram illustrating an example of a communication scheme of the communication terminal 100 assumed in the embodiment of the present technology.

FIG. 4 is a diagram illustrating an example of a communication scheme of the communication terminal 100 assumed in the embodiment of the present technology. In FIG. 4, the horizontal axis indicates time and the vertical axis indicates power.

Here, Low Power, Wide Area (LPWA) is assumed as the communication scheme. LPWA is a wireless communication scheme that enables long-distance communication with low power consumption. In the example of this communication scheme, it is assumed that the communication terminal 100 repeats one transmission sequence in every three minutes. In this transmission sequence, first, the GNSS reception unit 120 receives a GNSS signal. This requires at least 15 seconds. Hereinafter, this GNSS reception period is referred to as a communication preparation period.

Then, the communication terminal 100 transmits the position information obtained by the GNSS reception unit 120 and sensing information obtained by the sensor 110. At this time, here, a packet having the same content is repeatedly transmitted a plurality of times. The base station 200, which is the receiving side, combines the packets that have been transmitted the plurality of times and performs signal processing to enhance sensitivity. Therefore, it is possible to reduce interference between radio waves due to multipath or the like. Here, an example of a case where transmission in 0.4 seconds is performed four times at a transmission interval of 4.6 seconds is illustrated. Therefore, a transmission period of (4.6 seconds+0.4 seconds)×4 times=20 seconds is required in one transmission sequence. Note that the transmission sequence including transmission performed a plurality of times described here is a normal mode, and this normal mode is an example of the first transmission mode described in the claims.

Thereafter, when a short interval sleep period elapses, the transmission sequence ends. Thereafter, this transmission sequence is repeated.

In a case of operation enabled by power supply by energy harvesting in such a communication scheme, there is a possibility that the battery is dead in the power storage unit 150 during the communication preparation period or the transmission period, and the power amount stored is zero. If the battery is dead during the transmission period, transmission is interrupted and there is a possibility that the original communication performance is not fully exhibited. Therefore, in the present embodiment, as described below, the power amount stored in the power storage unit 150 is measured before start of the transmission sequence, and transmission is performed in the transmission mode according to the power amount stored.

2. Operation

First Example

In the first example, the communication terminal 100 measures the power amount stored in the power storage unit 150 before start of a transmission sequence. Then, in a case where there is not enough power amount for completing the transmission sequence, the transmission format is changed and the mode transitions to the high-sensitivity mode. Therefore, the number of times that transmission is repeatedly performed is reduced. Here, the high-sensitivity mode is a transmission mode in which reception sensitivity per packet is increased. As described above, in a case where it is assumed that a packet having the same content is transmitted a plurality of times in one transmission sequence, it is possible to receive the packet even if the reception sensitivity of transmission performed each time is low. In other words, in order to reduce the number of times of packet transmission, it is necessary to increase reception sensitivity per packet. Therefore, in the first example, in a case where there is not enough power for completing the transmission sequence, a packet including a known payload is transmitted. Note that the high-sensitivity mode is an example of the second transmission mode described in the claims.

Figure 5A:
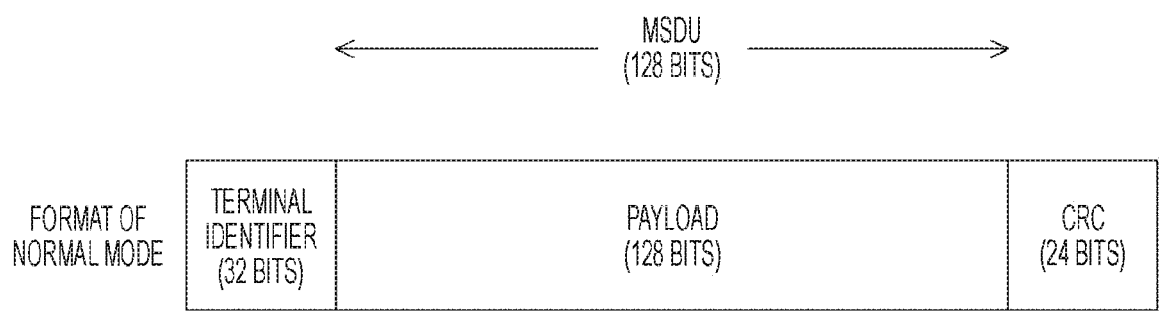
FIGS. 5A and 5B are diagrams illustrating an example of a packet format in a first example of the embodiment of the present technology.
Figure 5B:
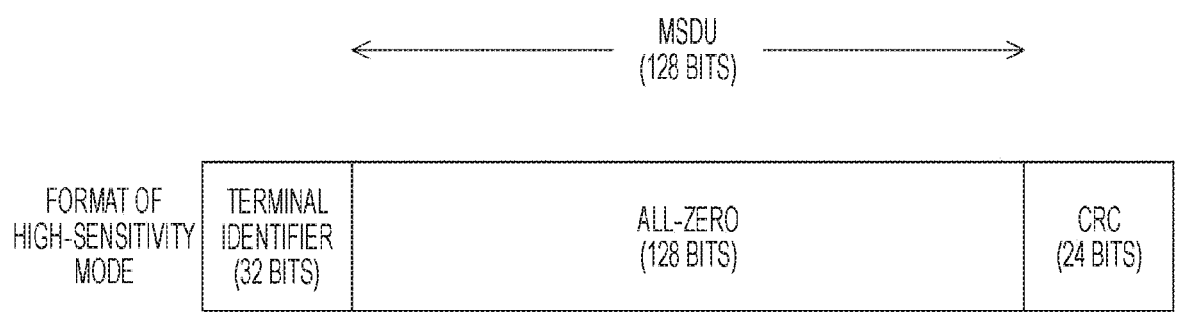

FIGS. 5A and 5B are diagrams illustrating an example of a packet format in the first example of the embodiment of the present technology.

FIG. 5A illustrates an example of the format of the normal mode of the packet transmitted from the communication terminal 100. This packet includes a 32-bit terminal identifier, a 128-bit payload, and a 24-bit CRC.

The terminal identifier is an identifier that identifies the communication terminal 100 that transmits this packet. The payload is a data part of this packet, and is a service providing-part media access control (MAC) service data unit (MSDU) forming a MAC frame. Note that the payload in this case is an example of the first data described in the claims. The CRC is a cyclic redundancy check code for detecting a payload error.

In a case where there is enough power amount to complete the transmission sequence, a packet in the format of the normal mode is transmitted a plurality of times. Therefore, the packets are combined on the receiving side and signal processing that increases sensitivity is performed.

FIG. 5B illustrates an example of the format of the high-sensitivity mode of the packet transmitted from the communication terminal 100. This format is similar to the above-described format of the normal mode in that this format has a terminal identifier and a CRC. However, in this format of the high-sensitivity mode, a 128-bit all-zero signal is included as a known signal. By using the known signal, the performance of low density parity check (LDPC) in the demodulation unit 213 of the base station 200 is improved. Therefore, sensitivity on the receiving side can be improved. Note that the all-zero signal in this case is an example of the second data described in the claims.

The base station 200, which is the receiving side, does not need to know in which format a packet is transmitted from the communication terminal 100. When the base station 200 receives a packet, the base station 200 attempts demodulation assuming both the formats of the normal mode and the high-sensitivity mode. As a result, in a case where a packet is transmitted a plurality of times and the packets are successfully combined, the base station 200 judges that transmission is performed in the normal mode, and the base station 200 performs processing using the terminal identifier and the payload. In contrast, in a case where the number of times of transmission is small and the packets are failed to be combined, the terminal identifier is extracted from a packet transmitted at one time. Therefore, the base station 200 can recognize that some trouble has occurred in the communication terminal 100 having the terminal identifier.

Figure 6:
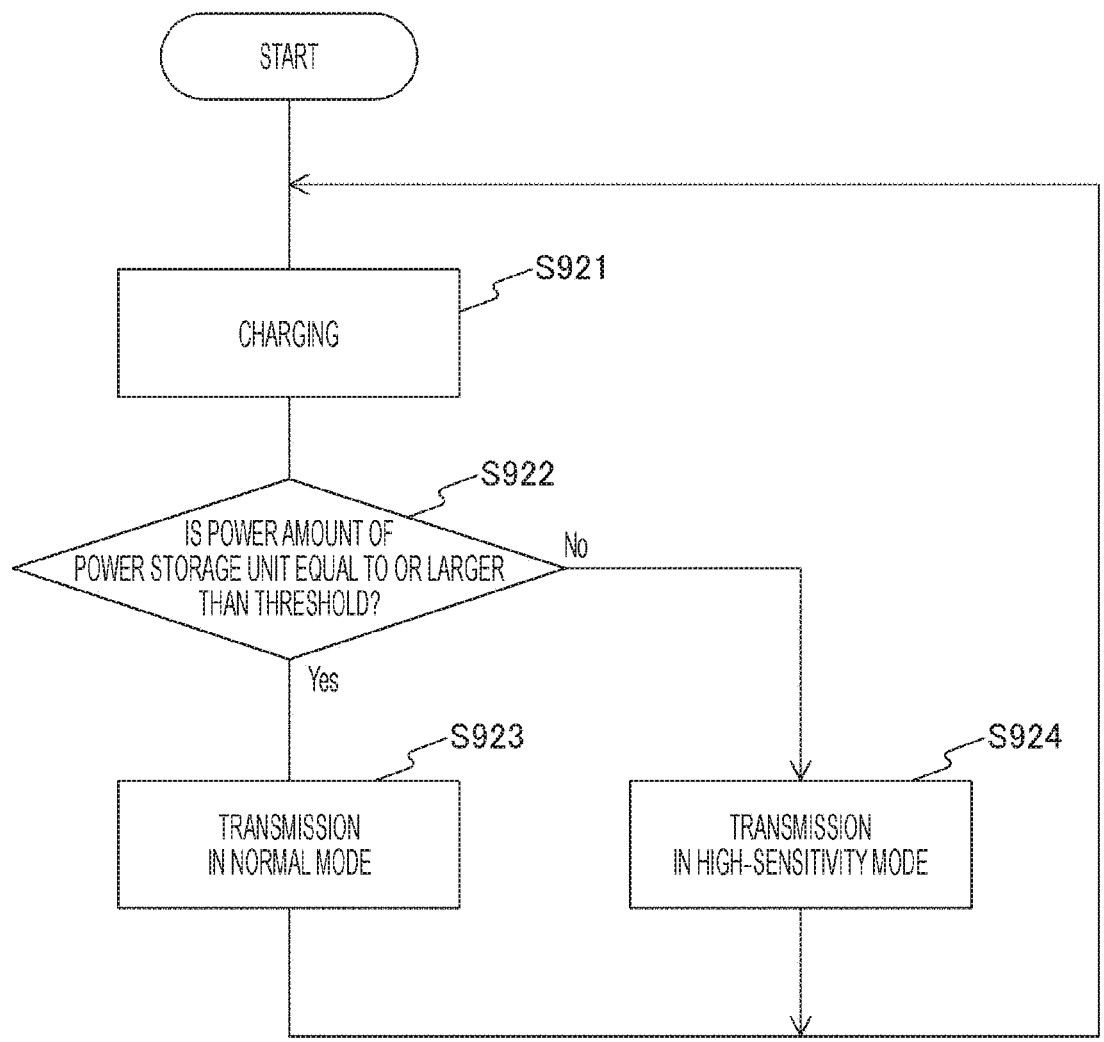
FIG. 6 is a flowchart illustrating an example of a processing procedure of the communication terminal 100 in the first example of the embodiment of the present technology.

FIG. 6 is a flowchart illustrating an example of a processing procedure of the communication terminal 100 in the first example of the embodiment of the present technology.

The charging unit 160 charges the power storage unit 150 by energy harvesting (step S921). Before the transmission sequence is started, the power control unit 170 measures the power amount stored in the power storage unit 150 and compares the power amount with a predetermined threshold (step S922). The predetermined threshold is the power amount required to transmit a packet a plurality of times in the normal mode.

As a result, if the power amount of the power storage unit 150 is equal to or larger than the predetermined threshold (step S922: Yes), it is judged that there is enough amount of power for completing the transmission sequence, and the control unit 180 causes the wireless communication unit 130 to perform transmission in the normal mode (step S923). In contrast, if the power amount of the power storage unit 150 is not equal to or larger than the predetermined threshold (step S922: No), it is judged that there is not enough power amount for completing the transmission sequence, and the control unit 180 causes the wireless communication unit 130 to perform transmission in the high-sensitivity mode (step S924).

Second Example

In this second example, the communication terminal 100 measures the power amount stored in the power storage unit 150 before a transmission sequence is started. In a case where there is not enough power amount for completing the transmission sequence, the communication terminal 100 does not perform transmission in the normal mode in order to perform only charging. Then, the transmission in the high-sensitivity mode is performed when the state transitions to the charging-only state and when the state returns from the charging-only state.

Figure 7A:
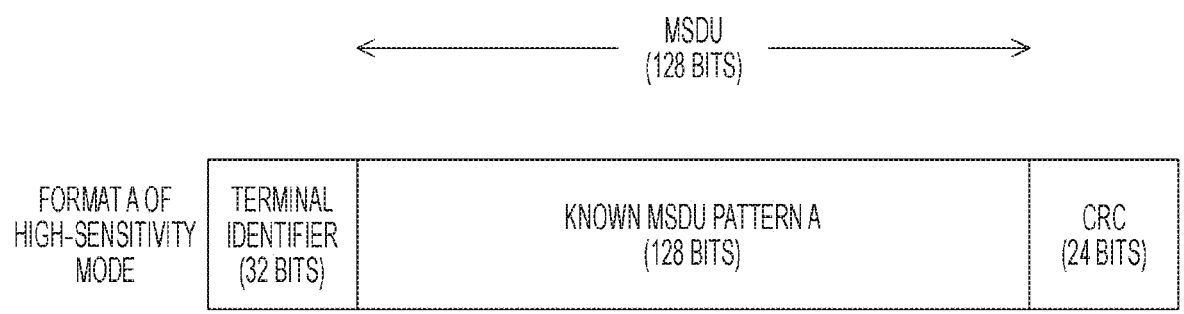
FIGS. 7A and 7B are diagrams illustrating an example of a packet format in a second example of the embodiment of the present technology.
Figure 7B:
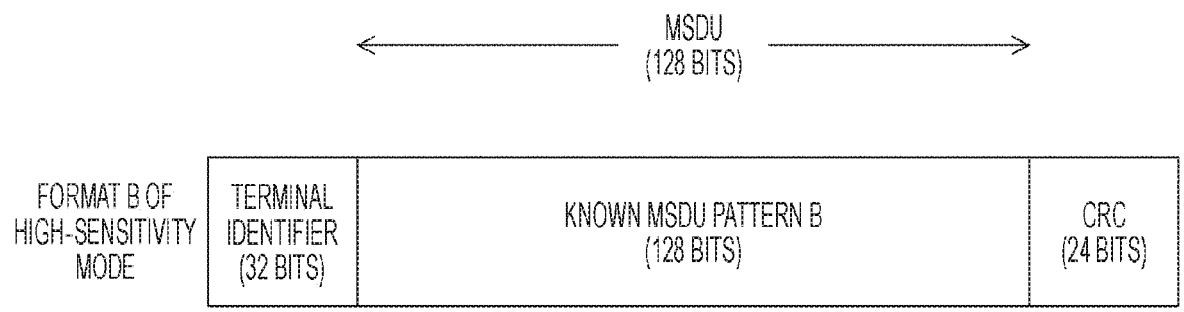

FIGS. 7A and 7B are diagrams illustrating an example of a packet format in the second example of the embodiment of the present technology. Note that since the format of the normal mode is similar to that of the first example described above, illustration thereof is omitted.

In the second example, as the format of the high-sensitivity mode, two types are prepared: a format A transmitted when the charging-only state starts and a format B transmitted when charging is completed. FIG. 7A illustrates the format A, and FIG. 7B illustrates the format B. These formats are similar to the above-described format of the normal mode in that each of the formats has a terminal identifier and CRC. However, in the format A, a known signal indicating that the charging-only state starts is included as the payload. Furthermore, in the format B, a known signal indicating that charging is completed and the state returns from the charging-only state is included as the payload. Note that the known signals in these cases are examples of the second data described in the claims.

Also in the second example, sensitivity on the receiving side can be improved by using the known signal. That is, in a situation where the power amount stored in power storage unit 150 is not sufficient, it is possible to perform transmission with less power.

Figure 8:
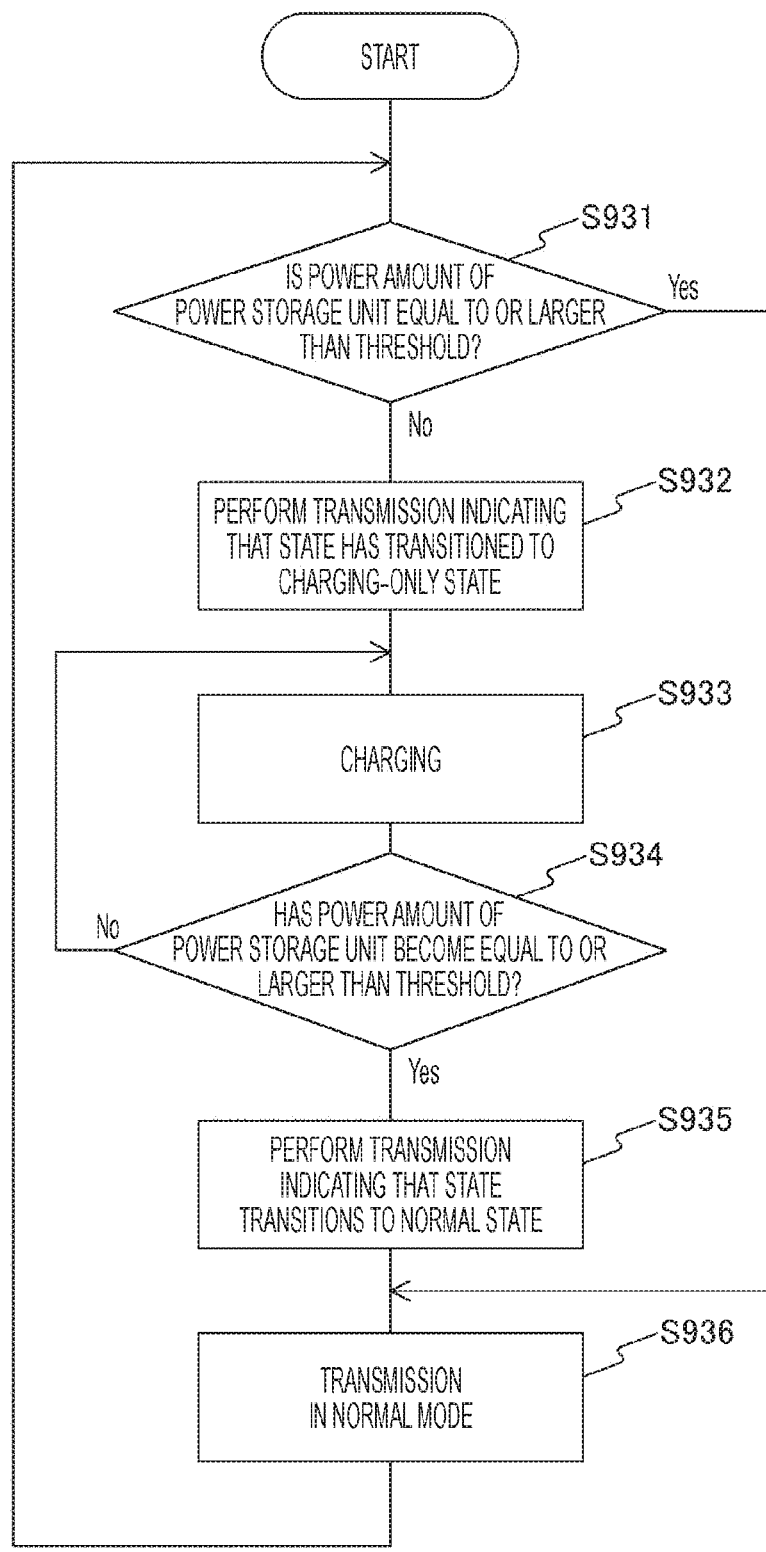
FIG. 8 is a flowchart illustrating an example of a processing procedure of the communication terminal 100 in the second example of the embodiment of the present technology.

FIG. 8 is a flowchart illustrating an example of a processing procedure of the communication terminal 100 in the second example of the embodiment of the present technology.

Before the transmission sequence is started, the power control unit 170 measures the power amount stored in the power storage unit 150 and compares the power amount with a predetermined threshold (step S931). As a result, if the power amount of the power storage unit 150 is equal to or larger than the predetermined threshold (step S931: Yes), it is judged that there is enough power amount for completing the transmission sequence, and the control unit 180 causes the wireless communication unit 130 to perform transmission in the normal mode (step S936).

In contrast, if the power amount of the power storage unit 150 is not equal to or larger than the threshold (step S931: No), it is judged that there is not enough power amount for completing the transmission sequence, and the state transitions to the charging-only state. At that time, the control unit 180 causes the wireless communication unit 130 to perform transmission indicating that the state has transitioned to the charging-only state in the high-sensitivity mode (step S932). Then, until the power amount of the power storage unit 150 becomes equal to or larger than the predetermined threshold (step S934: No), the charging unit 160 causes the power storage unit 150 to be charged by energy harvesting (step S933).

If the power amount of the power storage unit 150 has become equal to or larger than the threshold (step S934: Yes), the charging-only state is cancelled. At that time, the control unit 180 causes the wireless communication unit 130 to perform transmission indicating that the state transitions to the normal state in the high-sensitivity mode (step S935). Thereafter, the control unit 180 causes the wireless communication unit 130 to perform transmission in the normal mode (step S936).

Third Example

In this third example, the communication terminal 100 measures the power amount stored in the power storage unit 150 before a transmission sequence is started. In a case where there is not enough power amount for completing the transmission sequence, the communication terminal 100 transmits a known signal according to the power amount of the power storage unit 150 in the high-sensitivity mode. Therefore, the base station 200 can grasp the approximate amount of remaining power of the power storage unit 150 in the communication terminal 100.

Figure 9A:
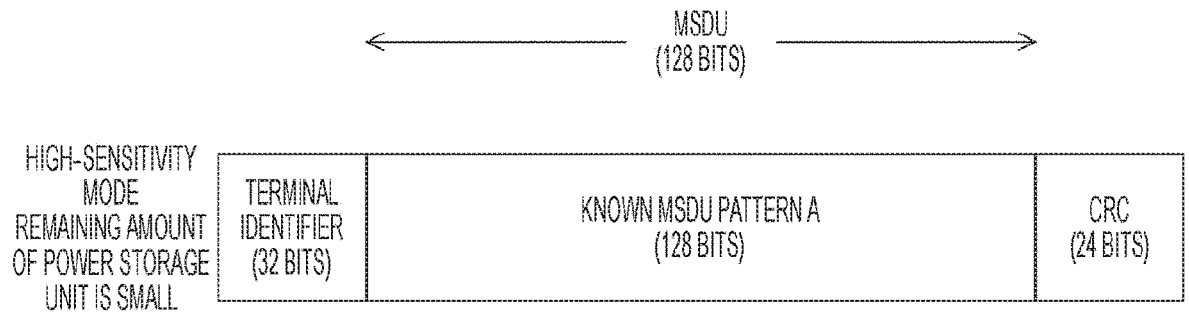
FIGS. 9A, 9B, and 9C are diagrams illustrating an example of a packet format in a third example of the embodiment of the present technology.
Figure 9B:
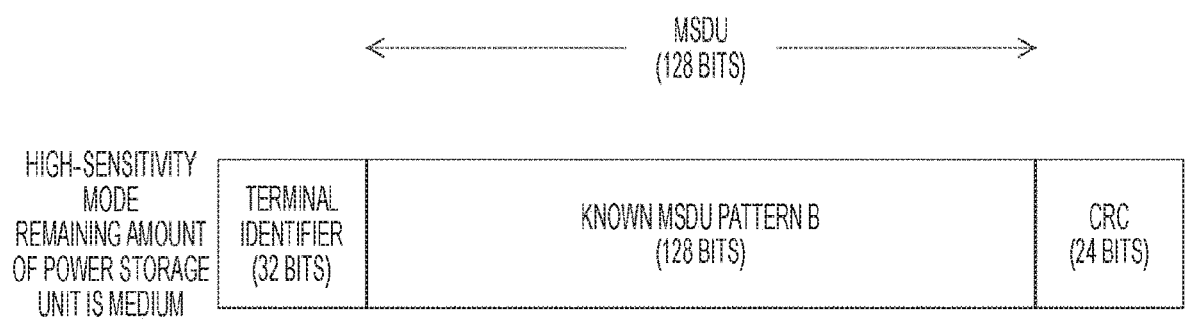
Figure 9C:
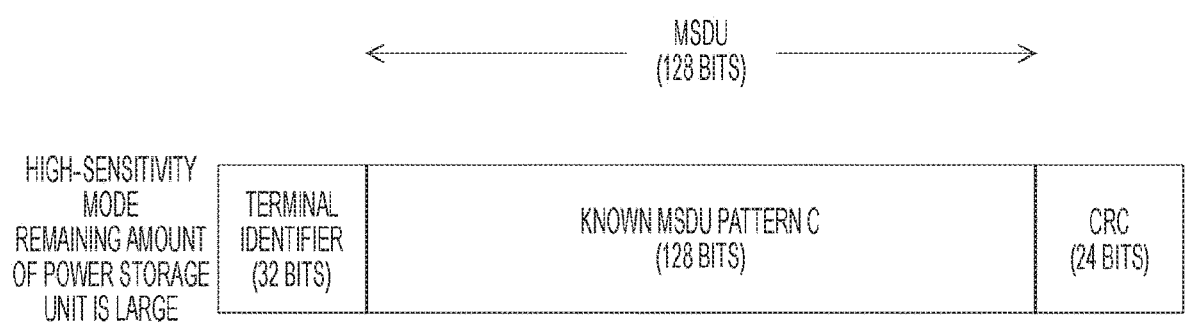

FIGS. 9A, 9B, and 9C are diagrams illustrating an example of a packet format in a third example of the embodiment of the present technology. Note that since the format of the normal mode is similar to that of the first example described above, illustration thereof is omitted.

In the third example, three types of high-sensitivity mode formats are prepared. FIG. 9A illustrates the format in a case where the power amount of the power storage unit 150 is relatively small. FIG. 9B illustrates the format in a case where the power amount of the power storage unit 150 is medium. FIG. 9C illustrates the format in a case where the power amount of the power storage unit 150 is relatively large. Note that in this example, it is assumed that in a case where there is not enough power amount for completing the transmission sequence, the power amount is divided into three levels. Therefore, even in the case of FIG. 9C, it cannot be said that the power amount is enough for completing the transmission sequence. However, instead of judging the power amount for completing the transmission sequence, the power amount may be indicated in three stages with the maximum power amount of the power storage unit 150 as a reference. Furthermore, the number of stages is not limited to three, and a plurality of stages may be distinguished.

These formats are similar to the above-described format of the normal mode in that each of the formats has a terminal identifier and CRC. However, a known signal indicating the power amount of the power storage unit 150 is included as the payload in each of the formats. For example, the upper 2 bits of the 128 bits may represent under which of the three stages the power amount falls, and the other fields are filled with zero values. Note that the known signals in these cases are examples of the second data described in the claims.

Also in the third example, sensitivity on the receiving side can be improved by using the known signal. That is, even in a situation where the power amount stored in the power storage unit 150 is not sufficient, it is possible to transmit an approximate amount of power in the power storage unit 150 with less power.

Figure 10:
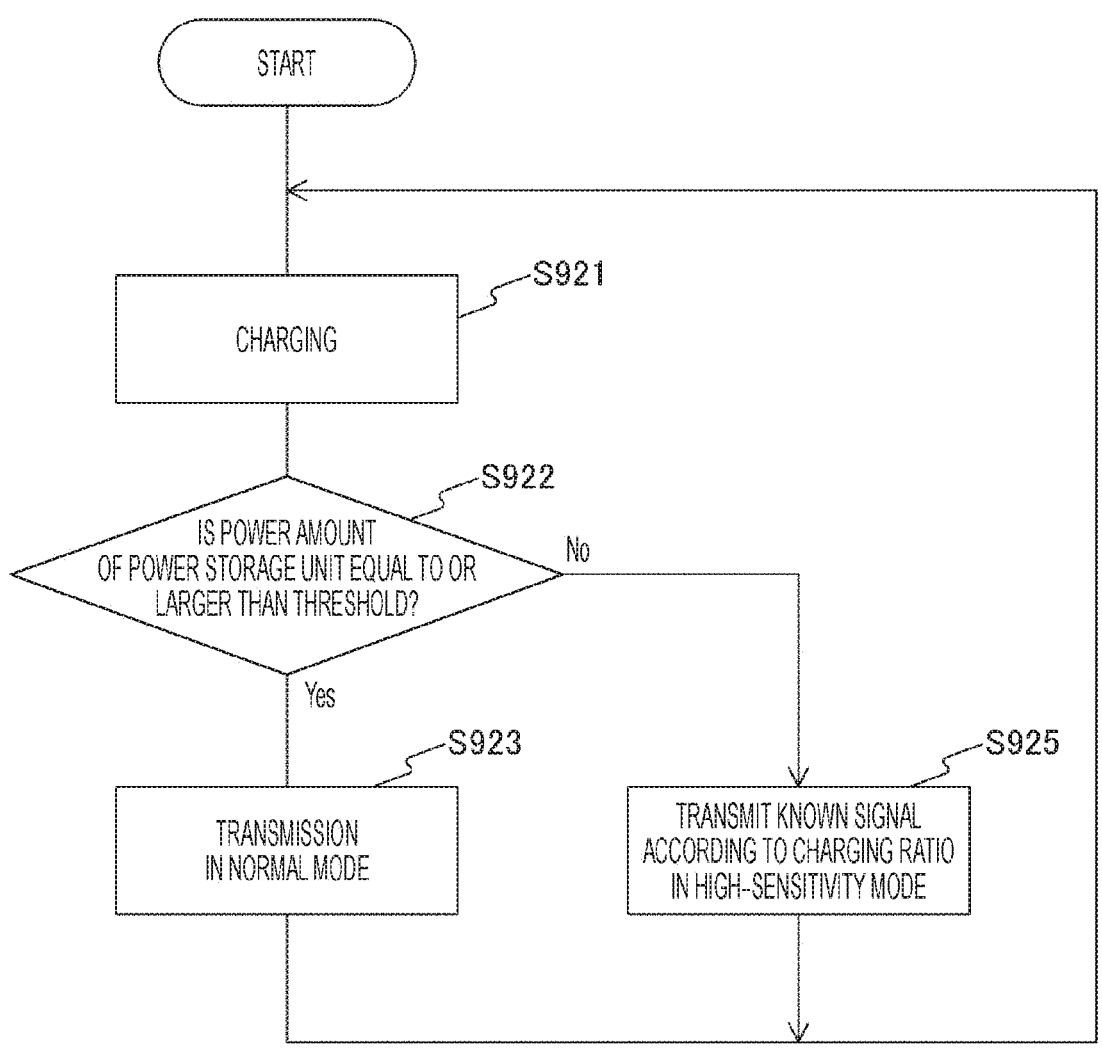
FIG. 10 is a flowchart illustrating an example of a processing procedure of the communication terminal 100 in the third example of the embodiment of the present technology.

FIG. 10 is a flowchart illustrating an example of a processing procedure of the communication terminal 100 in the third example of the embodiment of the present technology. Steps S921 to S923 of the processing procedure example in the third example are similar to those in the above-described first example.

In a case where the power amount of the power storage unit 150 is not equal to or larger than the threshold (step S922: No), the control unit 180 judges that there is not enough power amount for completing the transmission sequence, and the control unit 180 causes the wireless communication unit 130 to perform transmission in the high-sensitivity mode (step S925). At that time, a known signal corresponding to the charging ratio of the power storage unit 150 is transmitted in the payload.

[Effect]

As described above, according to the embodiment of the present technology, in the communication scheme on the premise that transmission is performed a plurality of times, the number of times that transmission is performed can be reduced by using a known signal to improve sensitivity of transmission performed at one time. Therefore, it is possible to avoid a situation where transmission is interrupted due to lack of power of the power storage unit 150 during transmission performed by the communication terminal 100, and power is consumed wastefully. In contrast, it becomes possible to inform the receiving side of the situation of the communication terminal 100 with less power.

Note that the above-described embodiment is an example for embodying the present technology, and a matter in the embodiment and a matter specifying the invention in the claims have a corresponding relationship. Similarly, a matter specifying the invention in the claims and a matter in the embodiment of the present technology, the matter having the same name as the name of the matter specifying the invention have a correspondence relationship. However, the present technology is not limited to the embodiment, and can be embodied by variously modifying the embodiment without departing from the gist thereof.

Furthermore, each of the processing procedures described in the above-described embodiment may be regarded as a method having the processing procedures, and may be a program for causing a computer to execute the processing procedure or a recording medium storing the program. As the recording medium, for example, a compact disc (CD), a MiniDisc (MD), a digital versatile disc (DVD), a memory card, a Blu-ray (registered trademark) Disc, or the like can be used.

Note that the effects described in the present Description are illustrations only and not limited, and may have other effects.

Note that the present technology can also be configured as follows.

(1) A wireless communication terminal including:

a communication unit configured to transmit a packet including an identifier of the communication unit;

a comparison unit configured to compare a power amount of a power storage unit with a predetermined threshold; and a control unit configured to cause the communication unit to transmit first transmission data as the packet in a first transmission mode in a case where the power amount is larger than the predetermined threshold and causes the communication unit to transmit second transmission data including a known payload as the packet in a second transmission mode in a case where the power amount is not larger than the predetermined threshold.

(2) The wireless communication terminal according to the (1), in which the first transmission mode is a mode in which the first transmission data is transmitted a plurality of times.

(3) The wireless communication terminal according to the (2), in which the second transmission mode is a mode in which the second transmission data is transmitted a smaller number of times than the plurality of times in the first transmission mode.

(4) The wireless communication terminal according to the (2) or (3), in which the predetermined threshold is a power amount necessary for transmitting the first transmission data in the plurality of times in the first transmission mode.

(5) The wireless communication terminal according to any one of the (1) to the (4), in which
the comparison unit acquires the power amount before a transmission sequence is started and compares the power amount with the predetermined threshold.

(6) The wireless communication terminal according to any one of the (1) to the (5) further including a charging unit configured to charge the power storage unit.

(7) The wireless communication terminal according to the (6), in which
the control unit causes the communication unit to transmit the second transmission data as the packet in the second transmission mode, the second transmission data including a known payload indicating transition to a state of performing only charging of the charging unit in a case where a state transitions to a state where the power amount is larger than the predetermined threshold to a state where the power amount is not larger than the predetermined threshold.

(8) The wireless communication terminal according to the (7), in which
the control unit causes the communication unit to transmit the second transmission data as the packet in the second transmission mode, the second transmission data including a known payload indicating termination of the state of performing only charging of the charging unit in a case where a state transitions to a state where the power amount is not larger than the predetermined threshold to a state where the power amount is larger than the predetermined threshold.

(9) The wireless communication terminal according to the (1), in which
the control unit causes the communication unit to transmit the second transmission data as the packet in the second transmission mode, the second transmission data including a known payload according to the power amount in a case where the power amount is not larger than the threshold.

(10) The wireless communication terminal according to any one of the (1) to the (9) further including
a sensor configured to sense ambient environment data,
in which the first transmission data includes the ambient environment data sensed by the sensor.

(11) The wireless communication terminal according to any one of the (1) to the (10), in which
the communication unit transmits the packet including an identifier of the wireless communication terminal.

(12) A wireless communication method including:
a procedure of causing a comparison unit to compare a power amount of a power storage unit with a predetermined threshold;
a procedure of causing the communication unit to transmit first transmission data in a first transmission mode together with an identifier of the communication unit in a case where the power amount is larger than the predetermined threshold; and
a procedure of causing the communication unit to transmit second transmission data including a known payload in a second transmission mode together with an identifier of the communication unit in a case where the power amount is not larger than the predetermined threshold.

REFERENCE SIGNS LIST

100 Communication terminal
110 Sensor
120 GNSS reception unit
130 Wireless communication unit
140 Storage unit
150 Power storage unit
160 Charging unit
170 Power control unit
180 Control unit
200 Base station
210 Reception circuit
211 Amplifier circuit
212 A/D converter
213 Demodulation unit
230 Communication antenna
240 Signal processing unit
300 Network
400 Server
500 Display device

The invention claimed is:

1. A wireless communication terminal, comprising:
a communication unit configured to transmit a packet;
a comparison unit configured to compare a power amount of a power storage unit with a threshold;
a charging unit configured to charge the power storage unit; and
a control unit configured to:
cause the communication unit to transmit first transmission data as the packet in a first transmission mode based on the power amount is larger than the threshold; and
cause the communication unit to transmit second transmission data as the packet in a second transmission mode based on the power amount is smaller than or equal to the threshold, wherein the second transmission data includes a payload that indicates transition to a state of charging of the charging unit in a case of transition from a state where the power amount is larger than the threshold to a state where the power amount is smaller than or equal to the threshold.

2. The wireless communication terminal according to claim 1, wherein
the first transmission data is transmitted a first number of times in the first transmission mode, and
the first number is greater than one.

3. The wireless communication terminal according to claim 2, wherein
the second transmission data is transmitted a second number of times in the second transmission mode, and
the second number is smaller than the first number.

4. The wireless communication terminal according to claim 2, wherein the threshold is a power amount necessary to transmit the first transmission data the first number of times in the first transmission mode.

5. The wireless communication terminal according to claim 1, wherein the comparison unit is further configured to acquire the power amount before start of a transmission sequence.

6. The wireless communication terminal according to claim 1, wherein
the payload indicates termination of the state of charging of the charging unit in a case of transition from the state where the power amount is smaller than or equal to the threshold to the state where the power amount is larger than the threshold.

7. The wireless communication terminal according to claim 1, wherein
the payload is based on the power amount.

8. The wireless communication terminal according to claim 1, further comprising a sensor configured to sense ambient environment data, wherein the first transmission data includes the ambient environment data sensed by the sensor.

9. The wireless communication terminal according to claim 1, wherein the transmitted packet includes an identifier of the wireless communication terminal.

10. A wireless communication method, comprising:
causing a comparison unit to compare a power amount of a power storage unit with a threshold;
causing a charging unit to charge the power storage unit;
causing a communication unit to transmit first transmission data in a first transmission mode based on the power amount is larger than the threshold; and
causing the communication unit to transmit second transmission data in a second transmission mode based on the power amount is smaller than or equal to the threshold, wherein the second transmission data includes a payload that indicates transition to a state of charging of the charging unit in a case of transition from a state where the power amount is larger than the threshold to a state where the power amount is smaller than or equal to the threshold.

* * * * *